United States Patent
Kwag

(10) Patent No.: US 11,990,632 B2
(45) Date of Patent: May 21, 2024

(54) BATTERY PACK

(71) Applicant: SAMSUNG SDI CO., LTD., Yongin-si (KR)

(72) Inventor: Nohyun Kwag, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 114 days.

(21) Appl. No.: 17/565,905

(22) Filed: Dec. 30, 2021

(65) Prior Publication Data

US 2022/0209349 A1 Jun. 30, 2022

(30) Foreign Application Priority Data

Dec. 31, 2020 (KR) .................. 10-2020-0189840

(51) Int. Cl.
| | |
|---|---|
| *H01M 50/213* | (2021.01) |
| *H01M 10/48* | (2006.01) |
| *H01M 10/6556* | (2014.01) |
| *H01M 50/284* | (2021.01) |
| *H01M 50/519* | (2021.01) |
| *H01M 50/569* | (2021.01) |

(52) U.S. Cl.
CPC ......... *H01M 50/213* (2021.01); *H01M 10/48* (2013.01); *H01M 10/6556* (2015.04); *H01M 50/284* (2021.01); *H01M 50/519* (2021.01); *H01M 50/569* (2021.01)

(58) Field of Classification Search
None
See application file for complete search history.

(56) References Cited

U.S. PATENT DOCUMENTS

| | | |
|---|---|---|
| 8,216,502 B2 | 7/2012 | Hermann et al. |
| 8,241,772 B2 | 8/2012 | Hermann et al. |
| (Continued) | | |

FOREIGN PATENT DOCUMENTS

| | | |
|---|---|---|
| CN | 111490193 A | 8/2020 |
| EP | 3 686 953 A1 | 7/2020 |
| (Continued) | | |

OTHER PUBLICATIONS

Dunn D. J.: "Engineering and structural adhesives" RAPRA Review Reports, vol. 15, No. 1, 2004.
(Continued)

*Primary Examiner* — Jonathan Crepeau
(74) *Attorney, Agent, or Firm* — Lee IP Law, P.C.

(57) ABSTRACT

A battery pack including battery cells including a first end portion and a second end portion in a length direction thereof; a cell holder having a first surface through which portions of the first end portions are exposed in the length direction; a circuit board having a first surface through which the portions of the first end portions and a portion of the first surface of the cell holder are exposed; measurement members connecting the battery cells to the circuit board; and a photocurable adhesive surrounding the measurement members, wherein the first end portions, the first surface of the cell holder, and the first surface of the circuit board are arranged in a stepped manner at least partially exposed to an outside of the circuit board in the length direction of the battery cells and are at least partially covered by the photocurable adhesive.

25 Claims, 9 Drawing Sheets

(56) References Cited

U.S. PATENT DOCUMENTS

| | | |
|---|---|---|
| 8,322,393 B2 | 12/2012 | Hermann et al. |
| 11,302,981 B2 | 4/2022 | Kang et al. |
| 2014/0356651 A1* | 12/2014 | Ciaccio .............. H01M 10/425 |
| | | 429/7 |
| 2015/0364745 A1 | 12/2015 | Wang et al. |
| 2017/0005377 A1 | 1/2017 | Rong |
| 2017/0005378 A1 | 1/2017 | Rong |
| 2020/0112000 A1 | 4/2020 | Kwag |
| 2021/0167346 A1 | 6/2021 | Kwag |
| 2021/0226261 A1 | 7/2021 | Lim et al. |

FOREIGN PATENT DOCUMENTS

| | | |
|---|---|---|
| JP | 2018-101502 A | 6/2018 |
| KR | 10-2019-0069128 A | 6/2019 |
| KR | 10-2019-0070548 A | 6/2019 |
| KR | 10-2019-0130927 A | 11/2019 |
| KR | 10-2021-0067700 A | 6/2021 |
| WO | WO 2017-132575 A1 | 8/2017 |

OTHER PUBLICATIONS

Extended European Search Report dated May 24, 2022 for corresponding EP Patent Application No. 21218375.0.
Chinese Office action dated Dec. 30, 2023.
Korean Office action dated Apr. 3, 2024.

* cited by examiner

BATTERY PACK

CROSS-REFERENCE TO RELATED APPLICATION

This application is based on and claims priority under 35 U.S.C. § 119 to Korean Patent Application No. 10-2020-0189840, filed on Dec. 31, 2020, in the Korean Intellectual Property Office, the disclosure of which is incorporated by reference herein in its entirety.

BACKGROUND

1. Field

Embodiments relate to a battery pack.

2. Description of the Related Art

Secondary batteries refer to batteries that may be repeatedly charged and recharged, unlike non-rechargeable primary batteries. Secondary batteries may be used as energy sources of devices such as mobile devices, electric vehicles, hybrid vehicles, electric bicycles, or uninterruptible power supplies. Secondary batteries may be individually used or secondary battery modules (packs) each including a plurality of secondary batteries connected as one unit may be used according to the types of external devices using secondary batteries.

SUMMARY

The embodiments may be realized by providing a battery pack including a plurality of battery cells, each battery cell including a first end portion and a second end portion in a length direction thereof; a cell holder having a first surface through which portions of the first end portions of the plurality of battery cells are exposed in the length direction of the plurality of battery cells; a circuit board having a first surface through which the portions of the first end portions of the plurality of battery cells and a portion of the first surface of the cell holder are exposed; measurement members connecting the plurality of battery cells to the circuit board; and a photocurable adhesive surrounding the measurement members, wherein the first end portions of the plurality of battery cells, the first surface of the cell holder, and the first surface of the circuit board are arranged in a stepped manner at least partially exposed to an outside of the circuit board in the length direction of the plurality of battery cells and are at least partially covered by the photocurable adhesive.

Portions of the first end portions of the plurality of battery cells, the first surface of the cell holder, and the first surface of the circuit board that are covered with the photocurable adhesive, are staggered in a transverse direction crossing the length direction of the plurality of battery cells and are exposed to the outside of the circuit board in the length direction of the plurality of battery cells.

Portions of the first end portions of the plurality of battery cells, the first surface of the cell holder, and the first surface of the circuit board that are covered with the photocurable adhesive, are at different levels in the length direction of the plurality of battery cells.

The portion of the first surface of the cell holder that is covered with the photocurable adhesive has a multilevel structure including different levels in a stepwise arrangement from the first end portions of the plurality of battery cells toward the second end portions of the plurality of battery cells.

The cell holder further includes a first assembly rib serving as a support between outer peripheral surfaces of the first end portions adjacent to each other, and the portion of the first surface of the cell holder that is covered with the photocurable adhesive includes an outer surface of the first assembly rib.

The cell holder further includes a first assembly rib serving as a support between the first end portions adjacent to each other, and the photocurable adhesive covers portions of the first end portions adjacent to each other, the first assembly rib, and the measurement members respectively connected to the first end portions adjacent to each other.

The photocurable adhesive covers portions of edge positions of the first end portions adjacent to each other.

The cell holder includes a holder body extending across the first end portions; a first assembly rib, the first assembly rib being a support between outer peripheral surfaces of the first end portions adjacent to each other; and at least one first sensing hole through which edge positions of the first end portions adjacent to each other are exposed.

The at least one first sensing hole includes a pair of first sensing holes facing each other with the first assembly rib therebetween and exposing the edge positions of the first end portions adjacent to each other.

The cell holder further includes at least one hollow protrusion surrounding a cooling passage connected to a gap between the outer peripheral surfaces of the first end portions adjacent to each other.

The first assembly rib protrudes from the holder body in a direction toward the plurality of battery cells, and the at least one hollow protrusion protrudes from the holder body in a direction away from the plurality of battery cells.

The first assembly rib is between two adjacent first end portions, and the at least one hollow protrusion is formed among three adjacent first end portions of the plurality of battery cells.

The first assembly rib and the at least one hollow protrusion are arranged along the outer peripheral surface of one of the first end portions.

The first assembly rib and the at least one hollow protrusion are arranged at non-overlapping positions along the outer peripheral surface of the first end portion.

The first assembly rib and the at least one hollow protrusion are alternately arranged along the outer peripheral surface of the first end portion.

The at least one hollow protrusion includes a pair of hollow protrusions facing each other with the first assembly rib therebetween.

The at least one first sensing hole includes a pair of first sensing holes that are on opposite sides of the first assembly rib and through which portions of the edge positions of the first end portions adjacent to each other are exposed.

The at least one hollow protrusion includes a pair of hollow protrusions, and a first direction, in which the pair of first sensing holes face each other with the first assembly rib therebetween, crosses a second direction, in which the pair of hollow protrusions face each other with the first assembly rib therebetween.

The photocurable adhesive extends in the first direction and covers at least a portion of the first surface of the circuit board to which a pair of the measurement members respectively connected to the first end portions adjacent to each other are connected, and the photocurable adhesive extends in the second direction and covers a portion of at least the first end portions and the first assembly rib which are exposed between the pair of hollow protrusions.

The circuit board includes a second sensing hole through which portions of the edge positions of the first end portions adjacent to each other are exposed.

The portions of the edge positions of the first end portions adjacent to each other are exposed to the outside of the circuit board through a pair of first sensing holes in the cell holder and the second sensing hole in the circuit board.

The first assembly rib is a support between the outer peripheral surfaces of the first end portions adjacent to each other and is also exposed through the second sensing hole.

The photocurable adhesive is at the edge positions of the first end portions adjacent to each other which are exposed through the second sensing hole, and is on the first assembly rib which serves as a support between the outer peripheral surfaces of the first end portions adjacent to each other and is exposed through the second sensing hole.

The cell holder further includes a pair of hollow protrusions, each hollow protrusion surrounding a cooling passage connected to a gap between the outer peripheral surfaces of the first end portions adjacent to each other are also exposed through the second sensing hole.

At least portions of the pair of hollow protrusions are covered with the photocurable adhesive.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
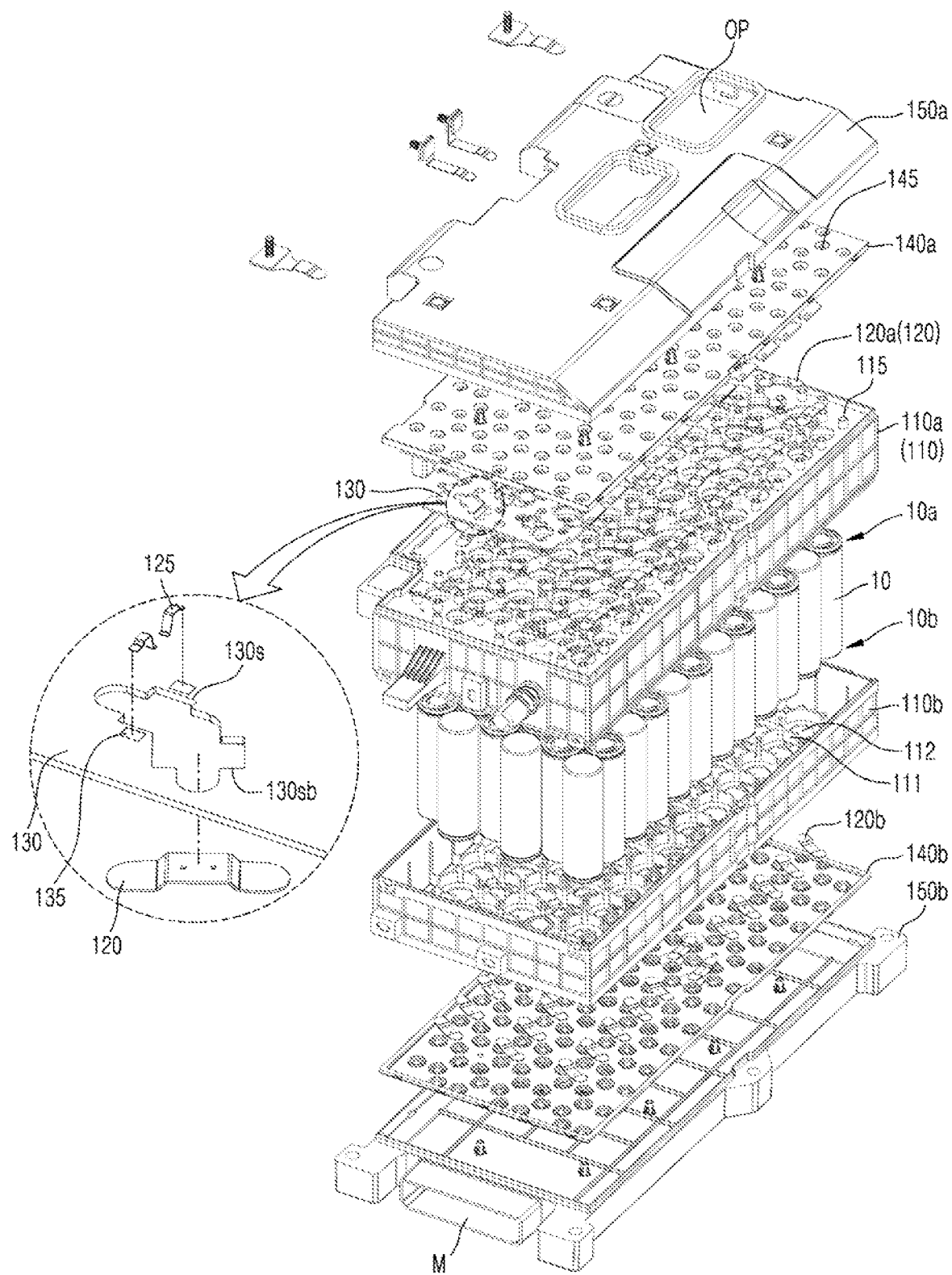
FIG. 1 is an exploded perspective view of a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" include any and all combinations of one or more of the associated listed items. Expressions such as "at least one of," when preceding a list of elements, modify the entire list of elements and do not modify the individual elements of the list.

Hereinafter, a battery pack will be described according to embodiments with reference to the accompanying drawings.

Figure 2:
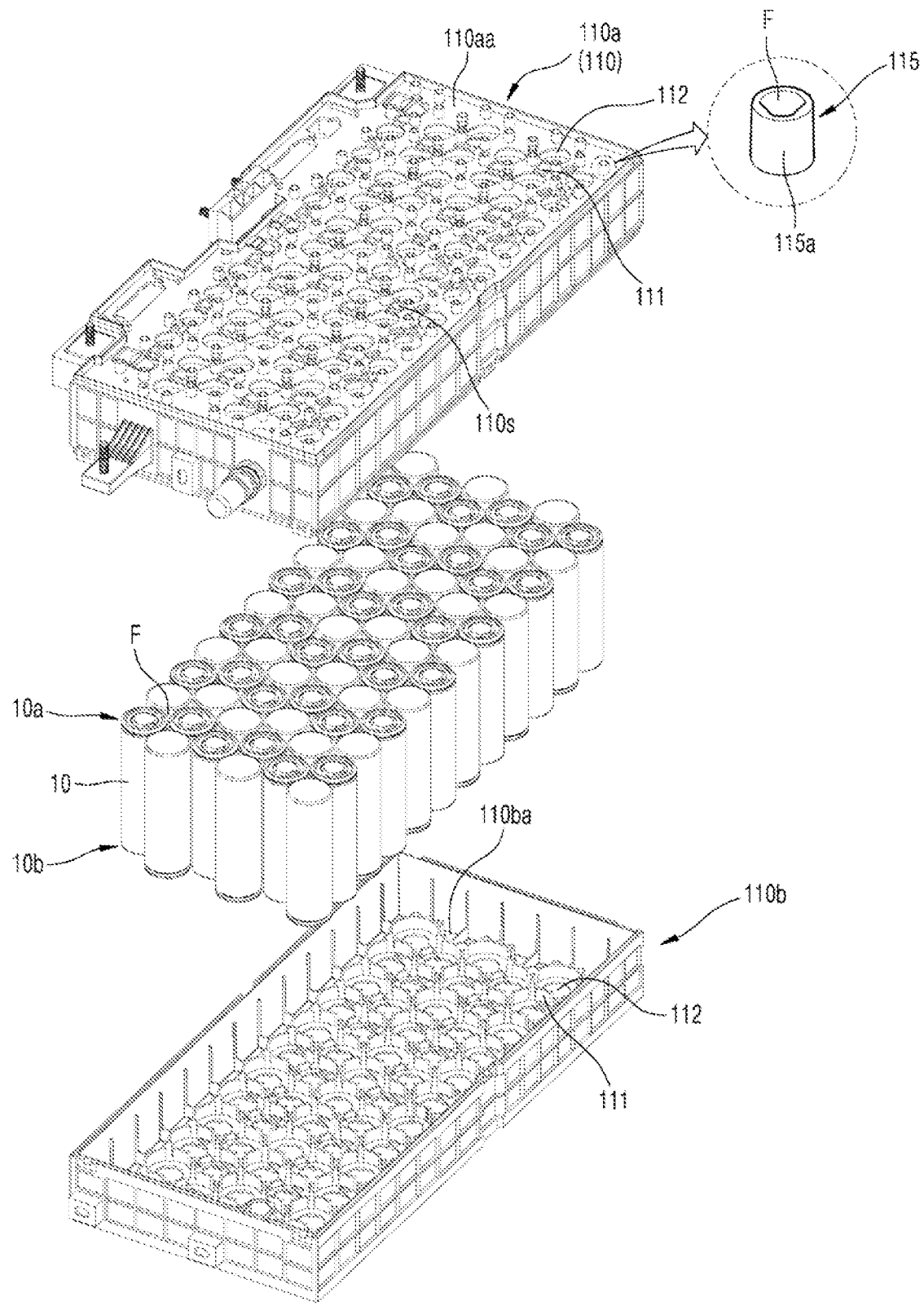
FIG. 2 is an exploded perspective view of a portion of the battery pack shown in FIG. 1.
Figure 3A:
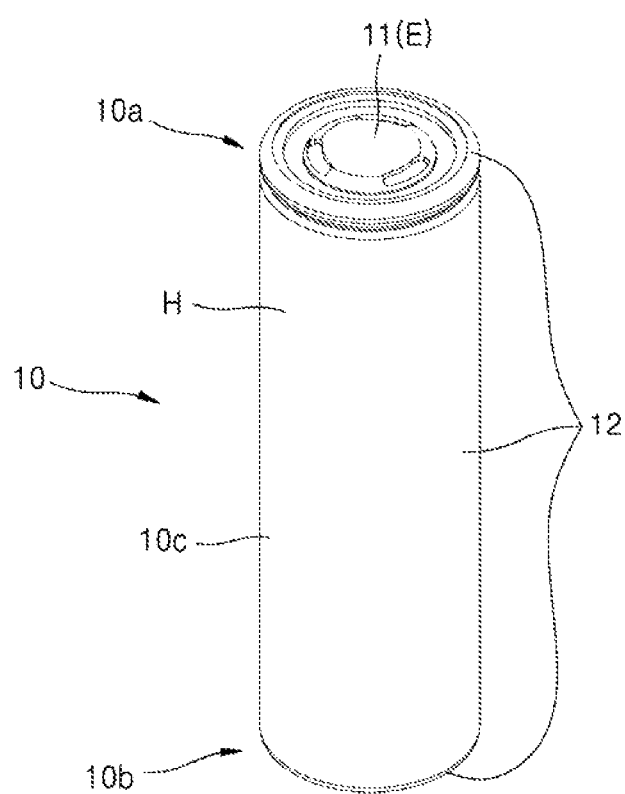
FIGS. 3A and 3B are perspective views of battery cells shown in FIG. 1.
Figure 3B:
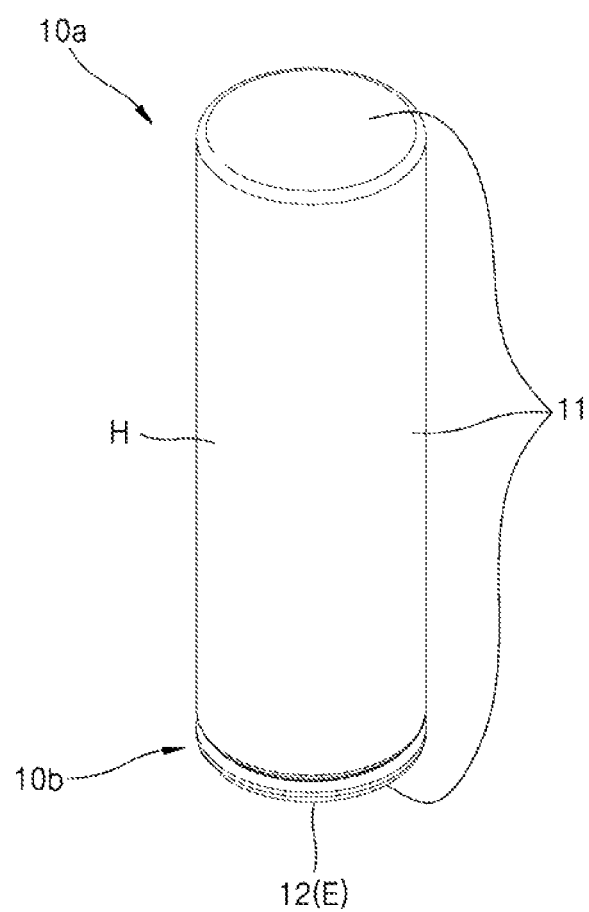
Figure 4:
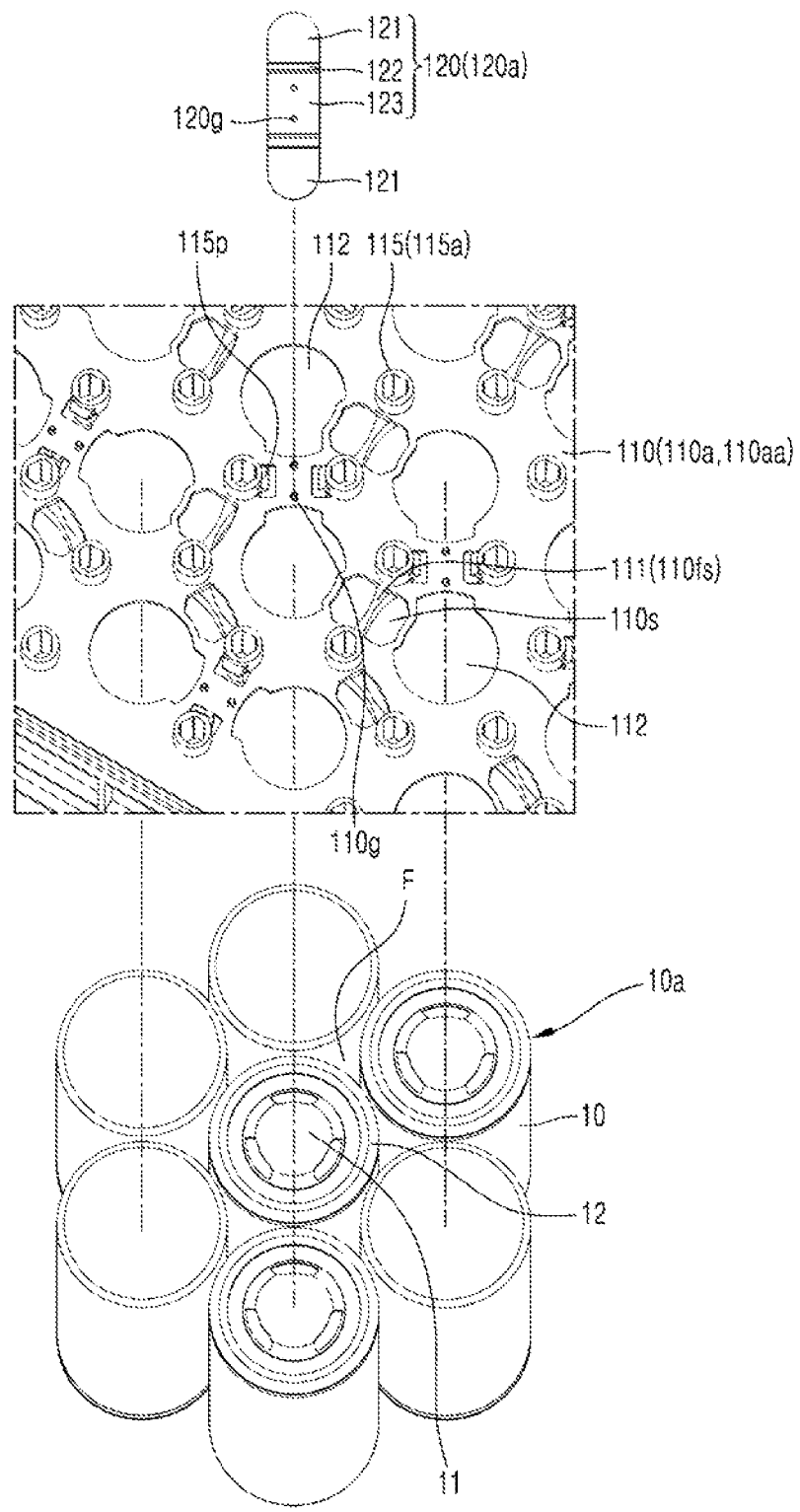
FIGS. 4 to 6 are different exploded perspective views of how a circuit board, a cell holder, and battery cells, which are shown in FIG. 1, are assembled.
Figure 5:
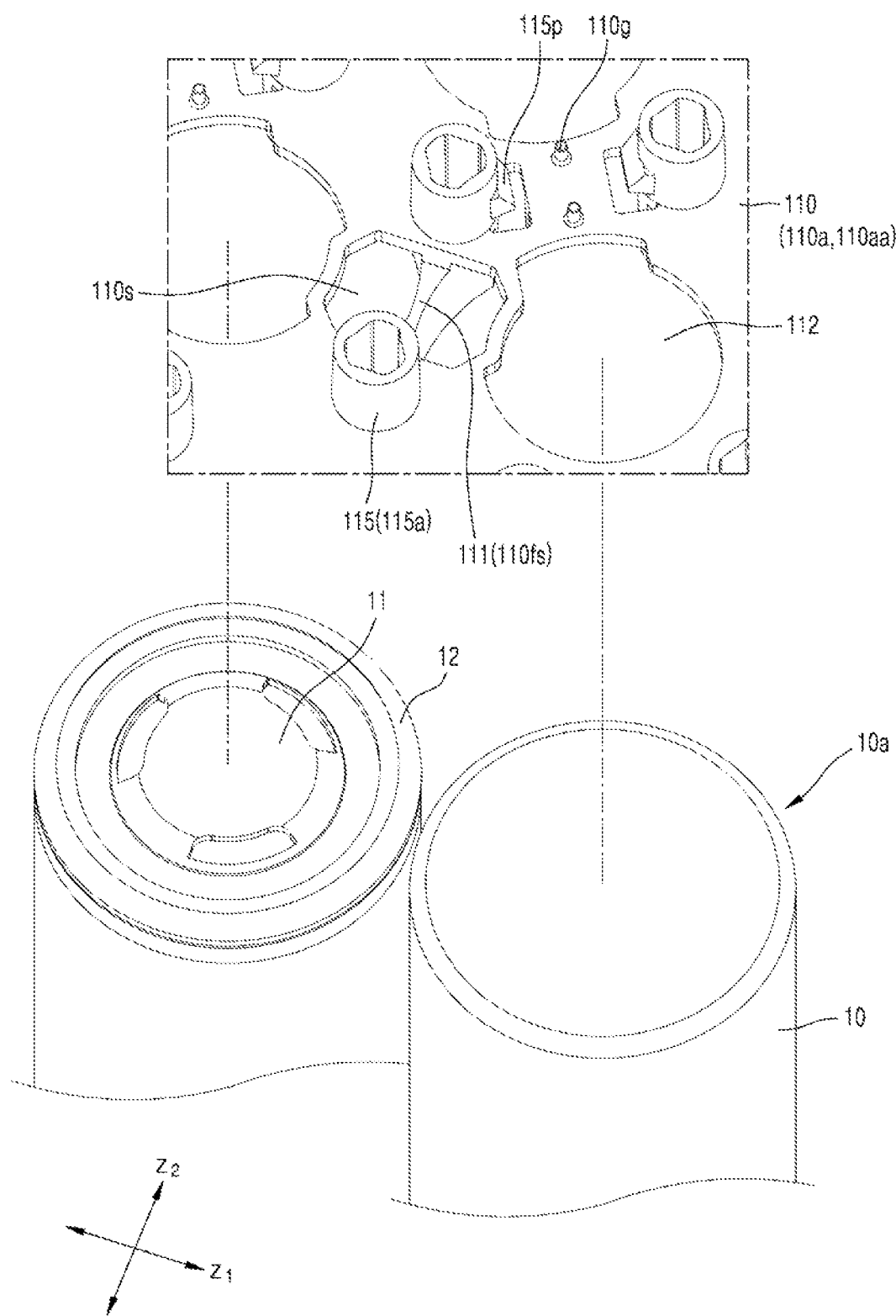
Figure 6:
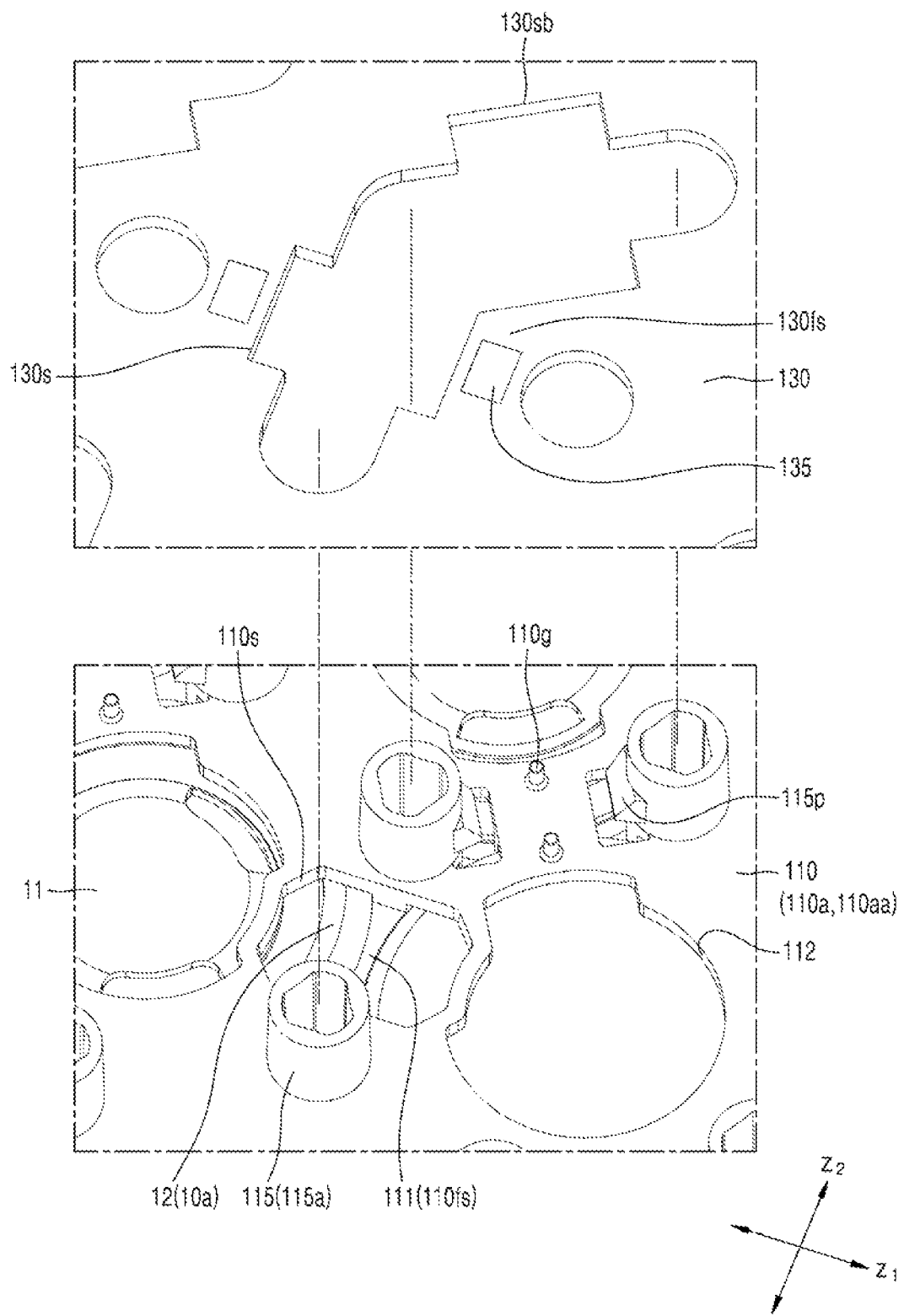
Figure 7:
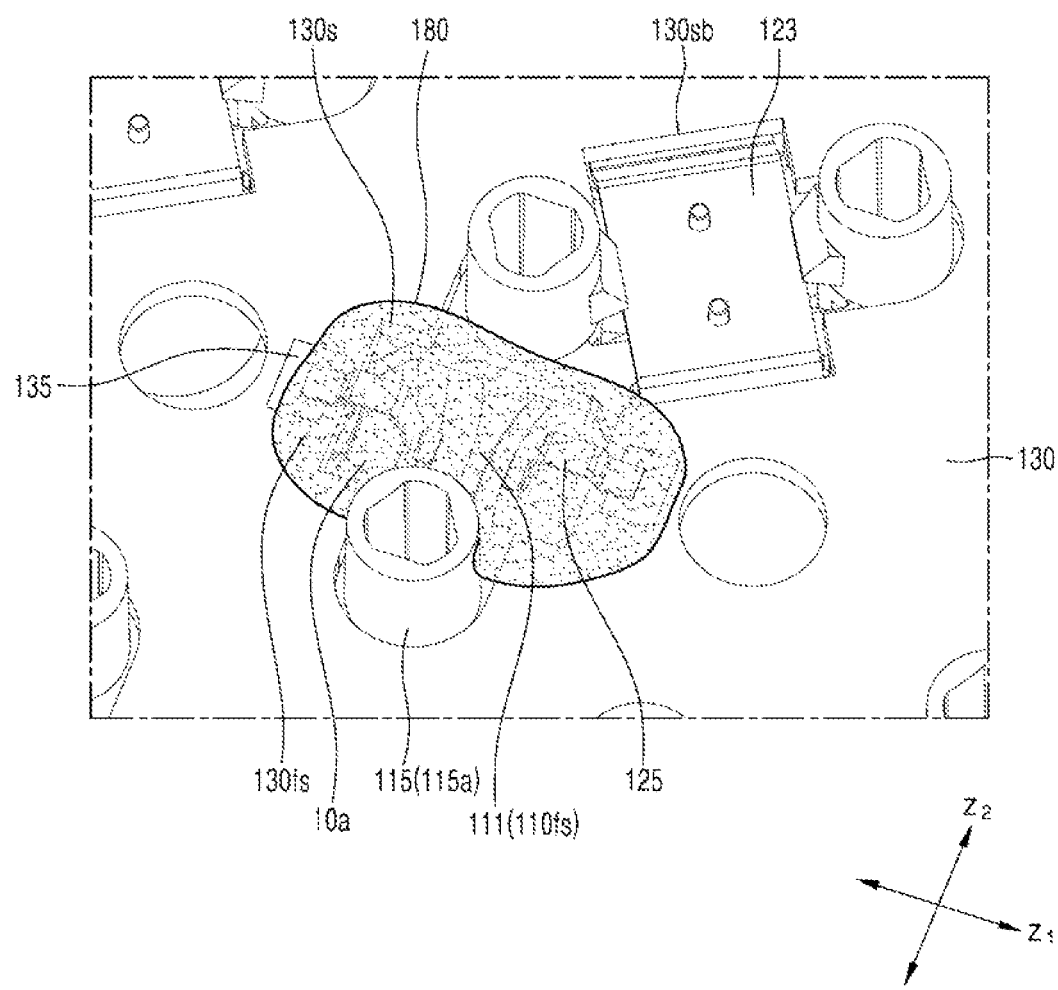
FIG. 7 is a perspective view of an assembled state of the circuit board, the cell holder, and the battery cells of FIGS. 4 to 6.

FIG. 1 is an exploded perspective view of a battery pack according to an embodiment. FIG. 2 is an exploded perspective view of a portion of the battery pack shown in FIG. 1. FIGS. 3A and 3B are perspective views of battery cells 10 shown in FIG. 1. FIGS. 4 to 6 are different exploded perspective views of how a circuit board 130, a cell holder 110, and battery cells 10, which are shown in FIG. 1, are assembled. FIG. 7 is a perspective view of an assembled state of the circuit board 130, the cell holder 110, and the battery cells 10 of FIGS. 4 to 6.

Referring to FIGS. 1 to 3B, according to an embodiment, the battery pack may include: a plurality of battery cells 10; a cell holder 110 in which the battery cells 10 are assembled or accommodated; a circuit board 130 electrically connected to the battery cells 10; and measurement members 125 through which the battery cells 10 are electrically connected to the circuit board 130.

Referring to FIGS. 3A and 3B, each of the battery cells 10 may include: first and second end portions 10a and 10b, which form both ends of the battery cell 10 in a length direction of the battery cell 10; and an outer peripheral surface 10c, which connects the first and second end portions 10a and 10b to each other. In an implementation, each of the battery cells 10 may be a circular or cylindrical battery cell including: first and second end portions 10a and 10b which have a circular shape; and an outer peripheral surface 10c which is rounded in a circular shape to connect the first and second end portions 10a and 10b having a circular shape. Hereinafter, the first end portion 10a of the battery cell 10 on which a photocurable adhesive 180 (refer to FIG. 7) is formed may be mainly described. Throughout the present specification, the term "first end portion 10a" may refer to the first end portion 10a of a battery cell 10, and the term "first end portion 10a" and the expression "the outer peripheral surface 10c of the first end portion 10a" may respectively refer to a battery cell 10 and the outer peripheral surface 10c of a battery cell 10. In an implementation, the expression "between adjacent first end portions 10a" or "between the outer peripheral surfaces 10c of adjacent first end portions 10a" may refer to the expression between adjacent battery cells 10 or between the outer peripheral surfaces 10c of adjacent battery cells 10.

First and second electrodes 11 and 12 may be on the first and second end portions 10a and 10b of each of the battery cells 10, respectively. In an implementation, the first and second electrodes 11 and 12 may be defined according to the positions thereof in the length direction of the battery cell 10, and may not be defined according to the positive (+) and negative (−) polarities thereof. In an implementation, according to the relative arrangement of adjacent battery cells 10, the first electrodes 11 of the adjacent battery cells 10 may have the same polarity and the second electrodes 12 of the adjacent battery cells 10 may have different polarities, or the first electrodes 11 of the adjacent battery cells 10 may have different polarities and the second electrodes 12 of the adjacent battery cells 10 may have the same polarity. In an implementation, the first electrodes 11 of adjacent battery cells 10 may be electrically connected to each other through first bus bars 120a, and in this case, the first bus bars 120a may connect first electrodes 11, which are adjacent to each other and have opposite polarities, to each other in series. Similarly, the second electrodes 12 of the adjacent battery cells 10 may be electrically connected to each other through second bus bars 120b, and in this case, the second bus bars 120b may connect second electrodes 12, which are adjacent to each other and have opposite polarities, to each other in series. Technical details regarding the first and second bus bars 120a and 120b will be described in greater detail below.

Referring to FIGS. 3A and 3B, the first and second electrodes 11 and 12 may be on the first and second end portions 10a and 10b of the battery cells 10, respectively. In an implementation, according to the arrangement of the battery cells 10, the first and second electrodes 11 and 12 may be at center positions on the first and second end portions 10a and 10b, respectively. In this case, on each of the first and second end portions 10a and 10b, the same electrode as that at the center position may be at an edge position (refer to FIG. 3B), or an electrode different from that on the center position may be at the edge position (refer to FIG. 3A). In an implementation, each of the battery cells 10 may include: an electrode assembly including a positive (+) electrode plate, a negative (−) electrode plate, and a separator arranged between the positive (+) electrode plate and the negative (−) electrode plate; a can H including an opening to receive the electrode assembly; and a cap assembly E coupled to the opening of the can H in which the electrode assembly is accommodated. In an implementation, the cap assembly E may be connected to the positive (+) electrode plate and may thus have a positive (+) polarity, and the can H may be connected to the negative (−) electrode plate and may thus have a negative (−) polarity. In an implementation, an edge portion of the cap assembly E fitted inside the opening of the can H may overlap an edge portion of the can H and may be clamped together with the edge portion of the can H to seal the can H, and thus the cap assembly E and a clamped portion of the can H surrounding the cap assembly E may be together on the first end portion 10a or the second end portion 10b of the battery cell 10. In an implementation, according to the arrangement of the battery cell 10, the cap assembly E at a center position and the can H located at an edge position may be together on the first end portion 10a (refer to FIG. 3A) or the second end portion 10b (refer to FIG. 3B). In an implementation, when the cap assembly E at the center position and the can H at the edge position are together on the first end portion 10a (refer to FIG. 3A), the cap assembly E at the center position and the can H at the edge position may have positive (+) and negative (−) polarities, respectively, and first and second electrodes 11 and 12 may be at the center position and the edge position of the first end portion 10a with an insulator being between the cap assembly E and the can H having opposite polarities. In an implementation, the can H may extend from the edge position of the first end portion 10a to the second end portion 10b along the outer peripheral surface 10c, and the second electrode 12 may be at both the center position and the edge position of the second end portion 10b.

In an implementation, when the cap assembly E at the center position and the can H at the edge position are together on the second end portion 10b (refer to FIG. 3B), the cap assembly E at the center position and the can H at the edge position may have positive (+) and negative (−) polarities, respectively, and second and first electrodes 12 and 11 may be at the center position and the edge position of the second end portion 10b with an insulator between the cap assembly E and the can H having opposite polarities. In an implementation, the can H may extend from the edge position of the second end portion 10b to the first end portion 10a through or along the outer peripheral surface 10c, and the first electrode 11 may be at both the center position and the edge position of the first end portion 10a. In an implementation, according to the arrangement of the battery cells 10, the first and second electrodes 11 and 12 may be at the center positions of the first and second end portions 10a and 10b and may also be at the edge positions of the first and second end portions 10a and 10b. As described in greater detail below, terminal holes 112 may be in first and second holders 110a and 110b into which the first and second end portions 10a and 10b of the battery cells 10 are respectively fitted, and the first holder 110a may further include first sensing holes 110s (refer to FIG. 5) in addition to the terminal holes 112. In an implementation, the terminal holes 112 may expose the first and second electrodes 11 and 12 at the center positions of the first and second end portions 10a and 10b, and the first sensing holes 110s may expose the first and second electrodes 11 and 12 at the edge positions of the first end portions 10a. As described above, the first electrodes 11 may be exposed through the terminal holes 112 of the first holder 110a, and both the first and second electrodes 11 and 12 may be exposed through the sensing holes 110s of the first holder 110a, such that information on the voltages of the first and second electrodes 11 and 12 of all the battery cells 10 may be collected through the circuit board 130 on the first holder 110a. As described in greater detail below, in an implementation, the circuit board 130 for collecting information about the voltages of the battery cells 10 may be selectively arranged on the first holder 110a among the first and second holders 110a and 110b, it is possible to collect information on the voltages of all the battery cells 10 through only the circuit board 130 arranged on the first holder 110a, and there may be no need to arrange an additional circuit board 130 on the second holder 110b.

In an implementation, referring to FIG. 2, cooling passages F may be between the battery cells 10. In an implementation, the battery cells 10 may include a plurality of rows of battery cells 10 arranged side by side in one direction, wherein battery cells 10 in adjacent rows may be staggered forward or backward in a row direction such that battery cells 10 in a row may be fitted between battery cells 10 in an adjacent row for a dense arrangement in which the battery cells 10 are densely arranged in a limited space. In an implementation, the cooling passage F may be among or between the outer peripheral surfaces 10c of three adjacent battery cells 10, and as a cooling medium (such as air) flows through the cooling passages F and contacts the outer peripheral surfaces 10c of the battery cells 10, the battery cells 10 may be cooled while heating a relatively high temperature in or during a charge or discharge operation. The cooling passages F between the outer peripheral surfaces 10c of the battery cells 10 adjacent to each other may extend in the length direction of the battery cells 10, and as described below, the cooling passages F may extend substantially across the entirety of the battery pack owing to hollow protrusions 115 protruding in length directions of the battery cells 10 from the first and second holders 110a and 110b into which the first and second end portions 10a and 10b of the battery cells 10 are fitted. In an implementation, the hollow protrusions 115 on the first and second holders 110a and 110b may surround the cooling passages F extending between the outer peripheral surfaces 10c of the battery cells 10 adjacent to each other and may form portions of (e.g., may be in fluid communication with) the cooling passages F continuously extending in the length direction of the battery cells 10. Technical details regarding the hollow protrusions 115 will be described below.

The battery cells 10 may include a plurality of battery cells 10 electrically connected to each other through bus bars 120, and the plurality of battery cells 10 electrically connected to each other may be structurally coupled to each other as or by being inserted into the cell holder 110. In an implementation, each of the battery cells 10 may be placed in position by being inserted into the cell holder 110, and the battery cells 10 inserted into the cell holder 110 may be structurally coupled to each other to form the battery pack. The cell holder 110 may include the first and second holders 110a and 110b coupled to face each other in mutually-facing directions with the battery cells 10 therebetween.

Referring to FIG. 4, the first holder 110a may include: a first holder body 110aa extending across or on the first end portions 10a of the battery cells 10; assembly ribs 111 protruding (e.g., inwardly) from the first holder body 110aa toward the battery cells 10 (e.g., toward the second holder 110b) to serve as supports between the outer peripheral surfaces 10c of the first end portions 10a adjacent to each other; and the terminal holes 112 and the first sensing holes 110s through which the first end portions 10a surrounded by the assembly ribs 111 are exposed. In an implementation, the assembly ribs 111, which may serve as supports between the outer peripheral surfaces 10c of the first end portions 10a adjacent to each other, may be between the outer peripheral surfaces 10c of the first end portions 10a adjacent to each other. In an implementation, each of the assembly ribs 111 may be between the outer peripheral surfaces 10c of the first end portions 10a of two adjacent battery cells 10. The assembly rib 111 may hold the battery cells 10 at proper or desired positions while supporting the outer peripheral surfaces 10c of the first end portions 10a adjacent to each other.

Different positions of the first end portions 10a surrounded by the assembly ribs 111 may be exposed through the terminal holes 112 and the first sensing holes 110s. In an implementation, the first electrodes 11 of the battery cells 10 may be exposed through the terminal holes 112, and the first bus bars 120a electrically connected to the first electrodes 11 of the battery cells 10 exposed through the terminal holes 112 may be on the first cell holder 110. In an implementation, the first sensing holes 110s may be in the first holder 110a together with the terminal holes 112. In this case, the center positions and the edge positions of the first end portions 10a of the battery cells 10 may be respectively exposed through the terminal holes 112 and the first sensing holes 110s. In an implementation, the terminal holes 112 may expose the first electrodes 11 at the center positions of the first end portions 10a, and the first sensing holes 110s may expose the second electrodes 12 at the edge positions of the first end portions 10a. As described above, the first and second electrodes 11 and 12 may be together at the center and edge positions of the first end portions 10a according to the arrangement of the battery cell 10.

The terminal holes 112 may be for electrically connecting the first electrodes 11 of the battery cells 10 to each other, and the first electrodes 11 exposed through the terminal holes 112 may be electrically connected to each other through the first bus bars 120a. The first sensing holes 110s may be for obtaining information on the voltages of the battery cells 10, and the first and second electrodes 11 and 12 exposed through the first sensing holes 110s may be connected to the measurement members 125 (refer to FIG. 7) and may thus be connected to the circuit board 130 (refer to FIG. 7) through the measurement members 125. In an implementation, the battery cells 10 may be electrically connected to each other through the terminal holes 112 of the first and second holders 110a and 110b through which the first and second electrodes 11 and 12 are exposed, and information on the voltages of the battery cells 10 may be obtained through the first sensing holes 110s of the first holder 110a through which the first and second electrodes 11 and 12 are exposed. In an implementation, information on the voltages of all of the battery cells 10 may be obtained through the first sensing holes 110s of the first holder 110a through which the first and second electrodes 11 and 12 are exposed. Throughout the present specification, the description of the first and second electrodes 11 and 12 of the battery cells 10 being exposed through the terminal holes 112 of the first and second holders 110a and 110b or the first and second electrodes 11 and 12 of the battery cells 10 being exposed through the first sensing holes 110s of the first holder 110a may not only mean that the first and second electrodes 11 and 12 of the battery cells 10 are entirely exposed, but may also mean that only portions of the first and second electrodes 11 and 12 are exposed. Even when the first and second electrodes 11 and 12 are partially exposed instead of being entirely exposed, it is possible to electrically connect the battery cells 10 to each other or obtain information on the voltages of the battery cells 10.

Referring to FIG. 2, similar to the first holder 110a, the second holder 110b (coupled to the first holder 110a in mutually-facing directions) may include: a second holder body 110ba; assembly ribs 111 protruding from the second holder body 110ba toward the battery cells 10 and serving as supports between the outer peripheral surfaces 10c of the second end portions 10b adjacent to each other; and terminal holes 112 through which the second end portions 10b (surrounded by the assembly ribs 111) are exposed.

Referring to FIGS. 2 and 4, the hollow protrusions 115 may be on the first and second holders 110a and 110b to surround the cooling passages F extending among the outer peripheral surfaces 10c of the battery cells 10. In an implementation, the hollow protrusions 115 may protrude (e.g., outwardly) from the first and second holder bodies 110aa and 110ba away from the battery cells 10, and to extend the cooling passages F among the outer peripheral surfaces 10c of adjacent battery cells 10 in the length direction of the battery cell 10. In an implementation, the hollow protrusions 115 may be at positions between the outer peripheral surfaces 10c of the adjacent battery cells 10. In an implementation, the hollow protrusions 115 on the first holder 110a may surround the cooling passages F among the first end portions 10a of which the outer peripheral surfaces 10c are adjacent to each other, e.g., each of the hollow protrusions 115 on the first holder 110a may be at a position among or between three first end portions 10a of which the outer peripheral surfaces 10c are adjacent to each other to surround the cooling passage F among the three first end portions 10a of which the outer peripheral surfaces 10c are adjacent to each other.

In an implementation, the hollow protrusions 115 may have walls protruding from the first and second holder bodies 110aa and 110ba in length directions of the battery cells 10 and surrounding the cooling passages F, and each of the hollow protrusions 115 may have an inner surface surrounding a cooling passage F and an outer surface 115a opposite the cooling passage F. The inner surface and the outer surface 115a of each of the hollow protrusions 115 may have various cross-sectional shapes. e.g., circular, elliptical, or polygonal shapes. In an implementation, the inner surface and the outer surface 115a of each of the hollow protrusions 115 may have different shapes. In an implementation, the inner surface of each of the hollow protrusions 115 may have a polygonal shape having rounded corners, and the outer surface 115a of each of the hollow protrusions 115 may have a circular shape.

Referring to FIG. 4, the hollow protrusions 115 and the assembly ribs 111 may surround each first end portion 10a, e.g., the outer peripheral surface 10c of each first end portion 10a. In an implementation, each of the hollow protrusions 115 may be formed among three first end portions 10a of which the outer peripheral surfaces 10c are adjacent to each other, and each of the assembly ribs 111 may be between two first end portions 10a of which the outer peripheral surfaces 10c are adjacent to each other.

In an implementation, in the arrangement in which six first end portions 10a are around the outer peripheral surface 10c of each first end portion 10a, assembly ribs 111 may be between the first end portion 10a and the six first end portions 10a, e.g., between the outer peripheral surface 10c of the first end portion 10a and the outer peripheral surfaces 10c of the six first end portions 10a. In an implementation, the first end portion 10a and the six first end portions 10a arranged along the outer peripheral surface 10c of the first end portion 10a may form first end portions 10a of which the outer peripheral surfaces 10c are adjacent to each other, and assembly ribs 111 may be between the outer peripheral surfaces 10c of the first end portions 10a that are adjacent to each other.

In an implementation, each hollow protrusion 115 may be between a pair of first end portions 10a which are adjacent to each other along the outer peripheral surface 10c of a first end portion 10a, e.g., the hollow protrusion 115 may be formed among the pair of first end portions 10a and the first end portion 10a. In this case, the pair of the first end portion 10a and the first end portion 10a may be three first end portions 10a of which the outer peripheral surfaces 10c are adjacent to each other, and the hollow protrusion 115 may be formed among the outer peripheral surfaces 10c of the three adjacent first end portions 10a.

As described above, assembly ribs 111 and hollow protrusions 115 may be arranged along the outer peripheral surface 10c of each first end portion 10a in an alternating manner. In an implementation, the positions (corresponding to the position at which each assembly rib 111 is formed), at which two first end portions 10a of which the outer peripheral surfaces 10c are adjacent to each other along the outer peripheral surface 10c of a first end portion 10a are arranged, and the positions (corresponding to the position at which each hollow protrusion 115 is formed), at which three first end portions 10a of which the outer peripheral surfaces 10c are adjacent to each other are arranged, may alternate along the outer peripheral surface 10c of the first end portion 10a. In an implementation, the assembly ribs 111 and the hollow protrusions 115 may be alternately arranged at exclusive positions, e.g., non-overlapping positions, (e.g., circumferentially) along the outer peripheral surface 10c of each first end portion 10a. As described below, the description of a pair of hollow protrusions 115 being arranged or a pair of mutually-facing hollow protrusions 115 being arranged with a assembly rib 111 therebetween may mean that a pair of hollow protrusions 115 are arranged along the outer peripheral surface 10c of a first end portion 10a with an assembly rib 111 therebetween.

Referring to FIGS. 4 and 5, latching jaws 115p for fixing the positions of the bus bars 120 may be on the hollow protrusions 115. In an implementation, the latching jaws 115p may physically interfere and fix each bus bar 120, which crosses a pair of hollow protrusions 115 and electrically connect battery cells 10 to each other. In an implementation, the latching jaw 115p may protrude from each hollow protrusion 115 toward another hollow protrusion 115 which forms a pair together with the hollow protrusion 115, and the latching jaw 115p may extend across a bus bar 120 (a connection portion 123 of the bus bar 120) between a pair of hollow protrusions 115 and press the bus bar 120 toward battery cells 10 to fix the position of the bus bar 120.

Coupling pins 110g for fixing the positions of the bus bars 120 may be on the cell holder 110. The coupling pins 110g may be at positions between each pair of hollow protrusions 115 and may be fitted to the bus bars 120 (the connection portions 123 of the bus bars 120) each extending across a pair of hollow protrusions 115. In an implementation, coupling holes 120g may be in the bus bars 120 (the connection portions 123 of the bus bars 120), and the coupling pins 110g to be fitted into the coupling holes 120g may be on the cell holder 110. In an implementation, the latching jaws 115p and the coupling pins 110g may be on the cell holder 110 and may fix the positions of the bus bars 120 on the cell holder 110, and thus the bus bars 120 on the cell holder 110 may be firmly fixed due to physical interference with the latching jaws 115p and the coupling pins 110g on the cell holder 110. In an implementation, the coupling pins 110g may include a pair of coupling pins 110g which are at positions spaced apart from each other in the direction in which a bus bar 120 extends across a pair of hollow protrusions 115.

Referring to FIG. 4, the first bus bar 120a may be on the first holder 110a and may electrically connect the first electrodes 11 exposed through the terminal holes 112 to each other. In an implementation, the first bus bars 120a may electrically connect the first electrodes 11 of the battery cells 10 to each other, and each of the first bus bars 120a may include: the connection portion 123 extending across the first holder 110a; and a pair of coupling portions 121 on or at both side of the connection portion 123 for connecting to first electrodes 11 exposed through terminal holes 112. In an implementation, each of the first bus bars 120a may include: the connection portion 123 on the first holder 110a; and the pair of coupling portions 121 stepped downward from both sides of the connection portion 123 toward first electrodes 11 of battery cells 10. Bent portions 122 may be stepped portions between the connection portion 123 and the coupling portions 121.

The connection portion 123 may be fixed to the cell holder 110 with the latching jaws 115p and the coupling pins 110g on the cell holder 110. In an implementation, the connection portion 123 may be moved downwardly in the length direction of battery cells 10 toward a position between a pair of hollow protrusions 115, fitted to coupling pins 110g between the pair of hollow protrusions 115, and inserted between latching jaws 115p on the pair of hollow protrusions 115, thereby fixing the bus bar 120 to the cell holder 110 by using the connection portion 123 physically interfering with the connection portion 123 and the coupling pins 110g and the latching jaws 115p.

Referring to FIG. 1, the second bus bars 120b may be on the second holder 110b and may electrically connect the second electrodes 12 exposed through the terminal holes 112 to each other. Technical details of the second bus bars 120b are substantially the same as or similar to those of the first bus bars 120a described above, and thus a repetitive description thereof may not be presented.

Referring to FIG. 6, the circuit board 130 may be on the first holder 110a. The circuit board 130 may collect information on the states of the battery cells 10, e.g., information on the voltages of the battery cells 10, and may control the charge and discharge operations of the battery cells 10 based on the collected state information. The circuit board 130 may collect information on the voltage of each of battery cells 10, and to this end, the circuit board 130 may be electrically connected to the first and second electrodes 11 and 12 of each of the battery cells 10.

Referring to FIGS. 6 and 7, second sensing holes 130s may be in the circuit board 130 for electrical connection with the battery cells 10. The second sensing holes 130s may be in the circuit board 130 at positions corresponding to the first sensing holes 110s in the cell holder 110, and the circuit board 130 and the battery cells 10 may be electrically connected to each other through the second sensing holes 130s of the circuit board 130 and the first sensing holes 110s of the cell holder 110. In an implementation, the first end portions 10a adjacent to each other may be exposed to the outside of the circuit board 130 through the first and second sensing holes 110s and 130s and may be connected to the circuit board 130 through the measurement members 125 connected to a first surface 130fs which is an outer surface of the circuit board 130.

In an implementation, each of the measurement members 125 may include a bonding wire having one end bonded to the circuit board 130 and the other end bonded to a battery cell 10, or a bonding ribbon having one end bonded to the circuit board 130 and the other end bonded to a battery cell 10. In an implementation, the bonding wire may be in the form of a thin metal wire, and the bonding ribbon may be in the form of a metal strip. The bonding wire having relatively low stiffness may be a combination of two or more bonding wires connected in parallel to each other to prevent disconnection.

The measurement members 125 may connect the circuit board 130 and the battery cells 10 through the second sensing holes 130s in the circuit board 130 and the first sensing holes 110s in the cell holder 110. The measurement members 125 may be formed by wire bonding or ribbon bonding, and in this case, e.g., the measurement members 125 may connect the circuit board 130 and the battery cells 10 to each other while extending through the first and second sensing holes 110s and 130s in a state in which the measurement members 125 are suspended after a first bonding process of bonding ends of the measurement members 125 to the circuit board 130 and a second bonding process of bonding the other ends of the measurement members 125 to the battery cells 10.

The second sensing holes 130s may be in the circuit board 130 at positions corresponding to (e.g., overlying or continuous with) the first sensing holes 110s of the cell holder 110 such that edge positions of the first end portions 10a may be exposed through the first and second sensing holes 110s and 130s. In an implementation, each of the first sensing holes 110s may have a size sufficient to expose each of the first end portions 10a adjacent to each other, and each of the second sensing holes 130s may have a size greater than the size of the first sensing holes 110s such that each of the second sensing holes 130s may continuously expose first end portions 10a adjacent to each other and also an assembly rib 111 serving as a support between the first end portions 10a.

Each of the second sensing holes 130s may also expose a pair of adjacent hollow protrusions 115 which face each other with an assembly rib 111 therebetween. In an implementation, each of the second sensing holes 130s may expose an assembly rib 111 together with a pair of hollow protrusions 115 facing each other with the assembly rib 111 therebetween.

In an implementation, each of the second sensing holes 130s may expose a plurality of structures adjacent to each other together. In an implementation, each of the second sensing holes 130s may expose a pair of first end portions 10a adjacent to each other, an assembly rib 111 supporting the pair of first end portions 10a, and a pair of hollow protrusions 115 facing each other with the assembly rib 111 therebetween. The hollow protrusions 115 may extend through the second sensing holes 130s of the circuit board 130 in the length direction of the battery cells 10 and may form or extend the cooling passages F extending between the outer peripheral surfaces 10c of the battery cells 10.

A pair of first sensing holes 110s facing each other with an assembly rib 111 therebetween may face each other in (e.g., may be aligned along) a first direction Z1; a pair of hollow protrusions 115 facing each other with the assembly rib 111 therebetween may face each other in (e.g., may be aligned along) a second direction Z2; the first direction Z1 and the second direction Z2 may cross each other. In an implementation, the first and second directions Z1 and Z2 may perpendicularly cross each other.

First and second electrodes 11 and 12, which are at the edge positions of the first end portions 10a according to the arrangement of the battery cells 10, may be exposed through the first and second sensing holes 110s and 130s. In an implementation, unlike the first and second sensing holes 110s and 130s at or on the edge positions of the first end portions 10a, the terminal holes 112 at or on the center positions of the first end portions 10a may expose only first electrodes 11. In an implementation, both the first and second electrodes 11 and 12 of the battery cells 10 may be exposed through the first and second sensing holes 110s and 130s, and there is no need to arrange circuit boards 130 on both sides of the first and second end portions 10a and 10b of the battery cells 10. In an implementation, even when the circuit board 130 is only above the first end portions 10a (e.g., only at one side of the battery pack), it is possible to measure the voltages of all the battery cells 10. In an implementation, the voltage of a battery cell 10 having a highest potential or a battery cell 10 having a lowest potential, which is on one of both ends of the battery pack according to the electrical connection of the battery cells 10, may be measured not through first and second sensing holes 110s and 130s at edge positions but through a terminal hole 112 at a center position.

Accommodation holes 130sb may be in the circuit board 130 to accommodate the connection portions 123 of the bus bars 120. In an implementation, the connection portions 123 of the bus bars 120 may be stepped from the coupling portions 121 coupled to the first end portions 10a in directions away from the first end portions 10a, and the circuit board 130 may be close to the first end portions 10a or brought into tight contact with the first end portions 10a due to the accommodation holes 130sb in the circuit board 130. In an implementation, the connection portions 123 may be accommodated in the accommodation holes 130sb of the circuit board 130, the circuit board 130 may be close to the first end portions 10a in spite of the stepped connection portions 123, the length of the measurement members 125 connected between the circuit board 130 and the first end portions 10a may be reduced, and the circuit board 130 may be placed in position without wobbling due to the bus bars 120 coupled to the first end portions 10a. If the accommodation holes (for accommodating the connection portions) were not formed in the circuit board, the circuit board could be placed on the connection portions and may thus be spaced apart from the first end portions. In such a case, the circuit board may be unstably supported, and the measurement members may have a relatively longer length, due to an increased distance between the circuit board 130 and the first end portions 10a. In an implementation, the circuit board 130 may be brought into tight contact with the first end portions 10a due to the accommodation holes 130sb which accommodate portions of the bus bars 120, e.g., the connection portions 123 of the bus bars 120. In an implementation, the accommodation holes 130sb for accommodating the connection portions 123 may be continuously connected to (e.g., continuous with) the second sensing holes 130s, e.g., as a portion of the second sensing holes 130s. In an implementation, each of the second sensing holes 130s may expose the connection portion 123 of a bus bar 120, a pair of first end portions 10a adjacent to each other, an assembly rib 111 supporting the pair of first end portions 10a, and a pair of hollow protrusions 115 facing each other with the assembly rib 111 therebetween.

Referring to FIGS. 5 and 6, the cell holder 110 (e.g., the first holder 110a) may have a first surface 110fs through or at which at least portions of the first end portions 10a are exposed (e.g., in the length direction of the battery cells 10), and the circuit board 130 may have the first surface 130fs through or at which at least portions of the first end portions 10a of the battery cells 10 and at least portions of the first surface 110fs of the cell holder 110 are exposed. Hereinafter, the description of the first end portions 10a of the battery cells 10 being exposed through the first surface 110fs of the cell holder 110 may mean that the first end portions 10a of the battery cells 10 are exposed through the first surface 110fs of the first holder 110a of the cell holder 110 which is close to the first end portions 10a.

In an implementation, the cell holder 110 (the first holder 110a) may include: the first sensing holes 110s through which the first end portions 10a are exposed in the length direction of the battery cells 10; and the first surface 110fs through which the first end portions 10a are exposed in the length direction of the battery cells 10. Throughout the present specification, the description of the first end portions 10a being exposed through the first surface 110fs of the cell holder 110 may mean that at least portions of the first end portions 10a are exposed to the outside of the battery pack through the first surface 110fs of the cell holder 110. In addition, the description of the first end portions 10a being exposed in the length direction of the battery cells 10 through which the first surface 110fs of the cell holder 110 exposes the first end portion 10a may mean that the first end portions 10a are exposed through the first surface 110fs of the cell holder 110 that forms the outer surface of the cell holder 110 in the length direction of the battery cells 10. In an implementation, the cell holder 110 may have inner and outer surfaces in the length direction of the battery cells 10, and the first end portions 10a may be exposed to the outside of the battery pack through the first surface 110fs, which is the outer surface of the cell holder 110.

In an implementation, the battery pack may include the battery cells 10, the cell holder 110 into which the battery cells 10 are inserted and assembled, and the circuit board 130 on the cell holder 110. In an implementation, the battery pack may further include a first separation member 140a (refer to FIG. 1) and a first cover 150a (refer to FIG. 1) that cover the circuit board 130. Throughout the present specification, the description of the portions such as the first end portions 10a being exposed to the outside of the battery pack may mean that the portions are exposed to the outside of the circuit board 130, but may not mean that the portions are necessarily exposed to the outside of the first separation member 140a (refer to FIG. 1) and the first cover 150a (refer to FIG. 1) which cover the circuit board 130. As described below, the first surface 130fs of the circuit board 130 exposed to the outside of the circuit board 130, the first surface 110fs of the cell holder 110, and the first end portions 10a of the battery cells 10 may be covered with the photocurable adhesive 180 (refer to FIG. 7), and thus the circuit board 130, the cell holder 110, and the battery cells 10 may be fixed together due to the photocurable adhesive 180 (refer to FIG. 7) which may continuously or at least partially cover the circuit board 130, the cell holder 110, and the battery cells 10.

Referring to FIGS. 6 and 7, the circuit board 130 may include the first surface 130fs through which the first end portions 10a of the battery cells 10 and the first surface 110fs of the cell holder 110 are exposed in the length direction of the battery cells 10. The circuit board 130 may include: the second sensing holes 130s through which the first end portions 10a and the first surface 110fs of the cell holder 110 are exposed in the length direction of the battery cells 10; and the first surface 130fs through which the first end portions 10a and the first surface 110fs of the cell holder 110 are exposed in the length direction of the battery cells 10. Throughout the present specification, the description of the first end portions 10a and the first surface 110fs of the cell holder 110 being exposed through the first surface 130fs of the circuit board 130 may mean that at least portions of the first end portions 10a and at least portions of the first surface 110fs of the cell holder 110 are exposed to the outside of the battery pack through the first surface 130fs of the circuit board 130. In addition, the description of the first end portions 10a and the first surface 110fs of the cell holder 110 being exposed in the length direction of the battery cells 10 through the first surface 130fs of the circuit board 130 may mean that the first end portions 10a and the first surface 110fs of the cell holder 110 are exposed through the first surface 130fs which forms the outer surface of the circuit board 130 in the length direction of the battery cells 10. In an implementation, the circuit board 130 may include inner and outer surfaces in the length direction of the battery cells 10, and the first end portions 10a and the first surface 110fs of the cell holder 110 may be exposed to the outside through the first surface 130fs forming the outer surface of the circuit board 130.

As described above, the first surface 130fs of the circuit board 130 exposed to or at the outside of the circuit board 130, the first surface 110fs of the cell holder 110, and the first end portions 10a of the battery cells 10 may be covered with the photocurable adhesive 180, and thus, the circuit board 130, the cell holder 110, and the battery cells 10 may be fixed together due to the photocurable adhesive 180 that continuously covers or partially covers at least a portion of the circuit board 130, the cell holder 110, and the battery cells 10.

In an implementation, the first surface 130fs of the circuit board 130, the first surface 110fs of the cell holder 110, and the first end portions 10a of the battery cells 10, which are covered with the photocurable adhesive 180, may be staggered in a transverse direction crossing the length direction of the battery cells 10 and may thus be exposed to the outside in the length direction of the battery cells 10.

The first surface 130fs of the circuit board 130 may correspond to the outer surface of the circuit board 130 which faces the outside of the circuit board 130 and may thus be exposed to the outside of the circuit board 130. In addition, portions of the first surface 110fs of the cell holder 110 may be exposed to the outside of the circuit board 130.

In an implementation, among portions of the first surface 110*fs* of the cell holder 110, surfaces (e.g., the first surface 110*fs*) of the assembly ribs 111 serving as supports between the first end portions 10*a* exposed through the first sensing holes 110*s* may be exposed to the outside of the circuit board 130 through the second sensing holes 130*s* of the circuit board 130. In an implementation, the first sensing holes 110*s* may expose the first end portions 10*a* adjacent to each other, and the assembly ribs 111 serving as supports between the first end portions 10*a* exposed through the first sensing holes 110*s* may be exposed to the outside of the circuit board 130 through the second sensing holes 130*s* of the circuit board 130. Herein, the description of the portions of the first surface 110*fs* of the cell holder 110 being exposed may mean that the outer surfaces of the assembly ribs 111 are exposed. The first surface 110*fs* of the cell holder 110 may include the outer surfaces of the assembly ribs 111, and the first surface 110*fs* of the cell holder 110 and the outer surfaces of the assembly ribs 111 may refer to an upper outer surface of the cell holder 110 and upper outer surfaces of the assembly ribs 111.

In an implementation, the first surface 110*fs* of the cell holder 110 may refer to the outer surface of the cell holder 110 in the length direction of the battery cell 10. In an implementation, the first surface 110*fs* of the cell holder 110 may refer to not only a surface at the same level in the length direction of the battery cells 10, but also outer surfaces at different levels in the length direction of the battery cells 10 as long as the surfaces form the outer (e.g., outwardly facing) surface of the cell holder 110. In an implementation, the first surface 110*fs* of the cell holder 110 may include the outer surface of the first holder body 110*aa* and the outer surfaces of the assembly ribs 111. In an implementation, the outer surface of the first holder body 110*aa* and the outer surfaces of the assembly ribs 111 may be at different levels in the length direction of the battery cells 10. In an implementation, the assembly ribs 111 may be at a level lower (e.g., closer to the second holder 110*b*) than the first holder body 110*aa* due to at least the thickness of the first holder body 110*aa* and may be supported at the level lower than the first holder body 110*aa* by supporting portions between the first holder body 110*aa* and the assembly ribs 111. In this case, the outer surface of the first holder body 110*aa* and the outer surfaces of the assembly ribs 111, which form the first surface 110*fs* of the cell holder 110, may be at different levels in the length direction of the battery cells 10, and all the outer surface of the first holder body 110*aa* and the outer surfaces of the assembly ribs 111 may be outer (e.g., outwardly facing) surfaces of the cell holder 110 and may thus be included in or considered a part of the first surface 110*fs* of the cell holder 110.

In an implementation, portions of the first surface 130*fs* of the circuit board 130 (e.g., exposed to the outside of the circuit board 130), the (e.g., exposed portion of the) first surface 110*fs* of the cell holder 110, and the (e.g., exposed portion of the) first end portions 10*a* of the battery cells 10 may be covered with the photocurable adhesive 180, and may be at different levels in the length direction of the battery cells 10. In an implementation, the first surface 130*fs* of the circuit board 130, the first end portions 10*a* of the battery cells 10, and the first surface 110*fs* of the cell holder 110 may be arranged from above to below in the length direction of the battery cells 10. In an implementation, the first surface 110*fs* of the cell holder 110 covered with the photocurable adhesive 180 may be at levels stepped from the first end portions 10*a* of the battery cells 10 toward the second end portions 10*b* of the battery cells 10.

Herein, when it is described that at least a portion of the first surface 110*fs* of the cell holder 110 is exposed to the outside of the circuit board 130, the first surface 110*fs* of the cell holder 110 exposed to the outside of the circuit board 130 may include the outer surfaces of the assembly ribs 111 and the outer surface of the first holder body 110*aa* surrounding the hollow protrusions. In an implementation, the outer surfaces of the assembly ribs 111, and the outer surface of the first holder body 110*aa* surrounding the hollow protrusions 115 may be exposed to the outside of the circuit board 130 through the second sensing holes 130*s*, and the photocurable adhesive 180 may be on the outer surfaces of the assembly ribs 111 and the outer surface of the first holder body 110*aa* surrounding the hollow protrusions 115. In an implementation, the photocurable adhesive 180 may be on the outer surfaces of the assembly ribs 111 and the outer surface of the first holder body 110*aa* surrounding the hollow protrusions 115 to fix the first surface 110*fs* of the cell holder 110 relative to the first surface 130*fs* of the circuit board 130 and the first end portions 10*a* of the battery cells 10 and bind the cell holder 110, the circuit board 130, and the battery cells 10 to each other. In an implementation, the first surface 110*fs* of the cell holder 110 may correspond to the outer surface of the cell holder 110 in the length direction of the battery cells 10, e.g., the upward outer surface of the cell holder 110 in the length direction of the battery cells 10. In an implementation, the outer surfaces 115*a* of the hollow protrusions 115 may be included in or considered a part of the outer surface of the cell holder 110, but the outer surfaces 115*a* of the hollow protrusions 115 may not be included in or considered a part of the first surface 110*fs* of the cell holder 110.

The photocurable adhesive 180 may be on the first surface 130*fs* of the circuit board 130, the first surface 110*fs* of the cell holder 110, and the first end portions 10*a* of the battery cells 10. The photocurable adhesive 180 may be applied to the first surface 130*fs* of the circuit board 130, the first surface 110*fs* of the cell holder 110, and the first end portions 10*a* of the battery cells 10, and may then be cured by light to fix the positions of the circuit board 130, the cell holder 110, and the battery cells 10. In an implementation, the photocurable adhesive 180 may cover (e.g., at least a part of) the first surface 130*fs* of the circuit board 130, the first surface 110*fs* of the cell holder 110, and the first end portions 10*a* of the battery cells 10, together with the measurement members 125 which connect the first surface 130*fs* of the circuit board 130, the first surface 110*fs* of the cell holder 110, and the first end portions 10*a* of the battery cells 10 to each other. In an implementation, the measurement members 125 having relatively low stiffness and supported in a suspended state may be covered with the photocurable adhesive 180, and the measurement members 125 may be insulated without wobbling or disconnecting.

The photocurable adhesive 180 may be at positions inside and outside the second sensing holes 130*s* of the circuit board 130. In an implementation, the photocurable adhesive 180 inside the second sensing holes 130*s* may cover (e.g., exposed portions of) the assembly ribs 111 of the cell holder 110 and edge positions of the first end portions 10*a* of the battery cells 10, and the photocurable adhesive 180 outside the second sensing holes 130*s* may cover (e.g., portions of) the first surface 130*fs* (connection pads 135) of the circuit board 130 to which the measurement members 125 are bonded. In an implementation, the photocurable adhesive 180 may completely cover the measurement members 125 including ends bonded to the first surface 130*fs* (connection pads 135) of the circuit board 130 and the edge positions of the first end portions 10*a*.

The photocurable adhesive 180 may cover the portions of a pair of first end portions 10*a* that are exposed through a pair of first sensing holes 110*s* at both sides of an assembly rib 111. In an implementation, the photocurable adhesive 180 may cover an assembly rib 111 and a pair of first end portions 10*a* at both sides of the assembly rib 111. In an implementation, the photocurable adhesive 180 may continuously cover a pair of measurement members 125 respectively connected to the pair of the first end portions 10*a*. In an implementation, the photocurable adhesive 180 may continuously cover the adjacent structures as described above, the adjacent structures may be firmly fixed, and the measurement members 125 may be reliably protected by the photocurable adhesive 180.

The photocurable adhesive 180 may be formed around the second sensing hole 130*s* between a pair of the hollow protrusions 115 exposed through the second sensing hole 130*s*. The hollow protrusions 115 may be formed in one piece with the cell holder 110 without using an adhesive such as the photocurable adhesive 180, and thus, the photocurable adhesive 180 may be between the pair of hollow protrusions 115. In an implementation, the photocurable adhesive 180 may be on at least portions of the hollow protrusions 115 as well as being on the assembly ribs 111 of the cell holder 110, and in this case, the coupling strength between the cell holder 110 and other structures such as the circuit board 130 and the battery cells 10 may be improved. In an implementation, the photocurable adhesive 180 may be on the outer (e.g., side) surfaces 115*a* of a pair of hollow protrusions 115 which face each other.

In an implementation, a pair of first sensing holes 110*s* may face or be aligned each other with an assembly rib 111 therebetween in the first direction Z1, and a pair of hollow protrusions 115 may face or be aligned each other with the assembly rib 111 therebetween in the second direction Z2 (crossing the first direction Z1). In an implementation, the photocurable adhesive 180 may cover at least a part of the first surface 130*fs* (connection pads 135) of the circuit board 130, e.g., to which a pair of measurement members 125 connected to first end portions 10*a* adjacent to each other in the first direction Z1 are connected. This may mean that the span of the photocurable adhesive 180 in the first direction Z1 may be sufficient to at least cover the portion of the first surface 130*fs* (e.g., the connection pads 135) of the circuit board 130 to which the pair of measurement members 125 are connected. In an implementation, the photocurable adhesive 180 may cover, e.g., in the second direction Z2, at least first end portions 10*a* and the assembly rib 111 which are exposed between the pair of the hollow protrusions 115, and this may mean that the span of the photocurable adhesive 180 in the second direction Z2 may be sufficient to cover at least the first end portions 10*a* and the assembly rib 111 which are exposed between the pair of hollow protrusions 115.

In an implementation, portions to which the photocurable adhesive 180 is applied may be exposed to the outside of the circuit board 130 in the length direction of the battery cells 10 such that UV light coming from the outside may not be blocked. That is, throughout the present specification, the description of the structures such as the first surface 130*fs* of the circuit board 130, the first surface 110*fs* of the cell holder 110, and the first end portions 10*a* of the battery cells 10, etc. are exposed to the outside may mean that the structures are exposed to UV light emitted thereto from the outside.

In an implementation, the photocurable adhesive 180 may be on the connection pads 135 on the first surface 130*fs* of the circuit board 130, the assembly ribs 111 of the cell holder 110, and edge portions of the first end portions 10*a* of the battery cells 10, which are exposed to the outside of the circuit board 130 in the length direction of the battery cells 10, to thereby receive UV light emitted thereto from the outside of the circuit board 130 in the length direction of the battery cells 10.

In an implementation, the photocurable adhesive 180 may be around the second sensing holes 130*s* of the circuit board 130, and structures around the second sensing holes 130*s*, e.g., the hollow protrusions 115 extending in the length direction of the battery cells 10, may not block UV light incident in the length direction of the battery cells 10 such that regions around the second sensing holes 130*s* may be irradiated with the UV light.

The photocurable adhesive 180 may be applied to the second sensing holes 130*s* in a fluid form such as a liquid or gel and may then be cured into a solid state by being irradiated with UV light. As described above, in the present disclosure, the photocurable adhesive 180 (which is curable with UV light may be used), and processing times may be reduced. In other battery packs, when a thermosetting adhesive is used, it may take more time to heat the thermosetting adhesive to the thermosetting temperature and maintain the thermosetting adhesive at the thermosetting temperature than to irradiate a photocurable adhesive with UV light. That is, the time required to irradiate a photocurable adhesive with UV light for curing the photocurable adhesive (e.g., according to an embodiment) may be significantly less than the time required to maintain a thermosetting adhesive at a high temperature for curing the thermosetting adhesive.

When the photocurable adhesive 180 is cured into a solid state by irradiation with UV light, the volume of the photocurable adhesive 180 may be reduced. Even in this case, however, stress may not arise in the measurement members 125 covered with the photocurable adhesive 180 because the photocurable adhesive 180 may have fluidity while being cured from a liquid or gel state, and disconnection of the measurement members 125 caused by extension or compression may be prevented. In some photocurable adhesives, which may be in close contact with measurement members in a cured state, may extend or compress the measurement members as the photocurable adhesive expands or contracts according to temperatures, and the measurement members could be disconnected. In an implementation, the photocurable adhesive 180 may have a relatively low coefficient of thermal expansion, e.g., in the range from about 81.5 μm/(m·° C.) to about 128.2 μm/(m·° C.). In an implementation, the photocurable adhesive 180 may include a urethane acrylate. As described above, the coefficient of thermal expansion of the photocurable adhesive 180 may be limited, and disconnection of the measurement members 125 caused by expansion/contraction of the photocurable adhesive 180 may be prevented.

Figure 8:
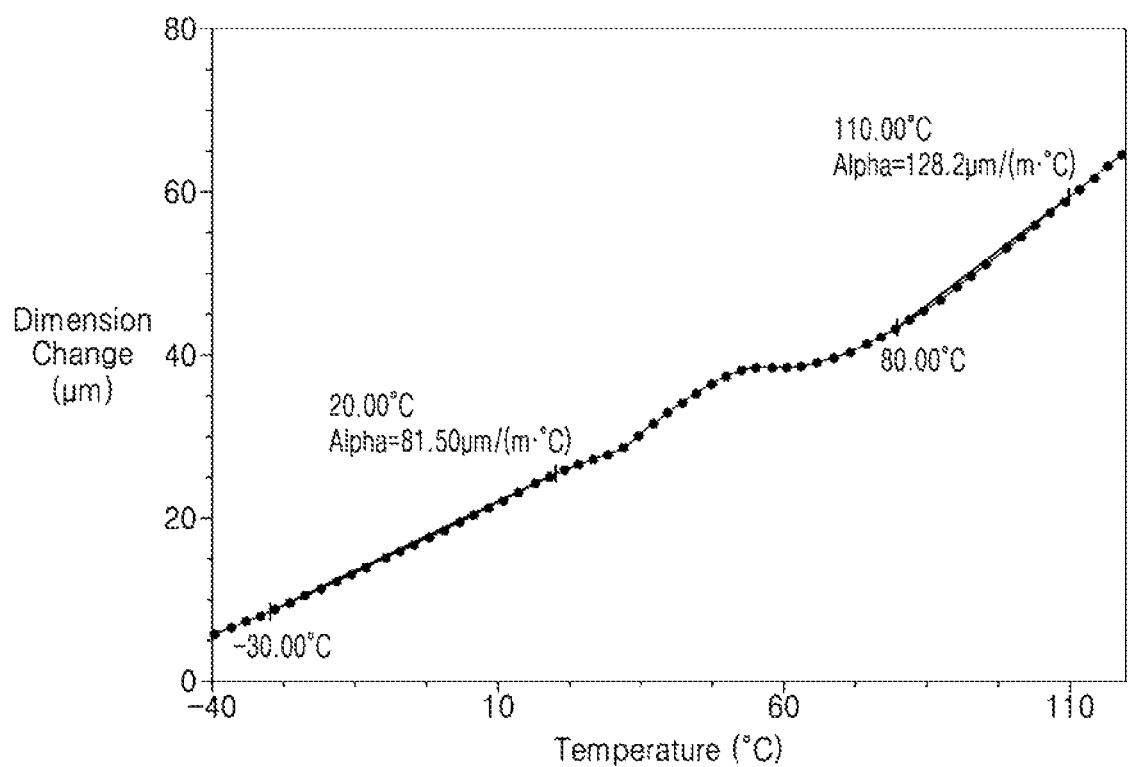
FIG. 8 is a graph of results of measurement of the coefficient of thermal expansion of a photocurable adhesive according to an embodiment.

Table 1 below and FIG. 8 show results of measurement of the coefficient of thermal expansion of the photocurable adhesive 180 according to an embodiment. The results of measurement shown in Table 1 and FIG. 8 were obtained in an expansion mode according to an embodiment from urethane acrylate used as the photocurable adhesive 180 by heating the urethane acrylate from −40° C. to 120° C. at a temperature increase rate of 5° C./min under a nitrogen atmosphere in a load condition of 0.05 N.

TABLE 1

| Temperature Range | Coefficient of thermal expansion |
|---|---|
| −30° C. to 20° C. | 81.5 μm/(m · ° C.) |
| 80° C. to 110° C. | 128.2 μm/(m · ° C.) |

Referring to FIG. 8, the photocurable adhesive 180 expanded with an approximately linear profile in a temperature range of −30° C. to 20° C. and in a temperature range of 80° C. to 110° C., and the coefficient of thermal expansion of the photocurable adhesive 180 may be calculated from the linear profile as being about 81.5 μm/(m·° C.) in the temperature range of −30° C. to 20° C. and about 128.2 μm/(m·° C.) in the temperature range of 80° C. to 110° C.

Referring to FIG. 1, in an embodiment, the battery pack may further include first and second separation members 140a and 140b on the first and second holders 110a and 110b, respectively. The first and second separation members 140a and 140b may be for spatially separating the cooling passages F extending in the hollow protrusions 115 of the first and second holders 110a and 110b from exhaust passages above the first and second end portions 10a and 10b of the battery cells 10, and penetration holes 145 may be in the first and second holders 110a and 110b to receive the hollow protrusions 115 therethrough. In an implementation, the cooling passages F formed among the outer peripheral surfaces 10c of the battery cells 10 may substantially penetrate the battery pack due to the hollow protrusions 115 of the first and second holders 110a and 110b and the penetration holes 145 of the first and second separation members 140a and 140b.

First and second covers 150a and 150b may be on the first and second separation members 140a and 140b. An opening OP, which forms a cooling medium inlet connected to the cooling passages F, and a connection port M, which forms a cooling medium outlet connected to a fluid device, may be formed in the first and second covers 150a and 150b.

As described above, according to the one or more of the above embodiments, the battery pack may have an improved arrangement structure for the battery cells 10, the cell holder 110, to which the battery cells 10 are coupled, and the circuit board 130, to which the battery cells 10 are electrically connected, such that the electrical connection between the battery cells 10 and the circuit board 130 may be reliably maintained, and the battery cells 10, the cell holder 110, and the circuit board 130 may be reliably coupled to each other.

One or more embodiments may provide a battery pack having an improved arrangement structure for battery cells, a cell holder, to which the battery cells are coupled, and a circuit board, to which the battery cells are electrically connected, such that the electrical connection between the battery cells and the circuit board may be reliably maintained, and the battery cells, the cell holder, and the circuit board may be securely coupled to each other.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated.

Accordingly, it will be understood by those of skill in the art that various changes in form and details may be made without departing from the spirit and scope of the present invention as set forth in the following claims.

What is claimed is:

1. A battery pack, comprising:
a plurality of battery cells, each battery cell including a first end portion and a second end portion in a length direction thereof;
a cell holder having a first surface through which portions of the first end portions of the plurality of battery cells are exposed in the length direction of the plurality of battery cells;
a circuit board having a first surface through which portions of the first end portions of the plurality of battery cells and a portion of the first surface of the cell holder are exposed;
measurement members connecting the plurality of battery cells to the circuit board; and
a photocurable adhesive surrounding the measurement members,
wherein the first end portions of the plurality of battery cells, the first surface of the cell holder, and the first surface of the circuit board are arranged in a stepped manner at least partially exposed to an outside of the circuit board in the length direction of the plurality of battery cells and are at least partially covered by the photocurable adhesive,
wherein the cell holder includes at least one hollow protrusion surrounding a cooling passage connected to a gap between outer peripheral surfaces of adjacent ones of the first end portions.

2. The battery pack as claimed in claim 1, wherein portions of the first end portions of the plurality of battery cells, the first surface of the cell holder, and the first surface of the circuit board that are covered with the photocurable adhesive, are staggered in a transverse direction crossing the length direction of the plurality of battery cells and are exposed to the outside of the circuit board in the length direction of the plurality of battery cells.

3. The battery pack as claimed in claim 1, wherein portions of the first end portions of the plurality of battery cells, the first surface of the cell holder, and the first surface of the circuit board that are covered with the photocurable adhesive, are at different levels in the length direction of the plurality of battery cells.

4. The battery pack as claimed in claim 3, wherein the portion of the first surface of the cell holder that is covered with the photocurable adhesive has a multilevel structure including different levels in a stepwise arrangement from the first end portions of the plurality of battery cells toward the second end portions of the plurality of battery cells.

5. The battery pack as claimed in claim 1, wherein:
the cell holder further includes a first assembly rib serving as a support between the outer peripheral surfaces of the first end portions adjacent to each other, and
the portion of the first surface of the cell holder that is covered with the photocurable adhesive includes an outer surface of the first assembly rib.

6. The battery pack as claimed in claim 1, wherein:
the cell holder further includes a first assembly rib serving as a support between the first end portions adjacent to each other, and
the photocurable adhesive covers portions of the first end portions adjacent to each other, the first assembly rib, and the measurement members respectively connected to the first end portions adjacent to each other.

7. The battery pack as claimed in claim 1, wherein the photocurable adhesive covers portions of edge positions of the first end portions adjacent to each other.

8. The battery pack as claimed in claim 1, wherein the cell holder further includes:
 a holder body extending across the first end portions;
 a first assembly rib, the first assembly rib being a support between the outer peripheral surfaces of the first end portions adjacent to each other; and
 at least one first sensing hole through which edge positions of the first end portions adjacent to each other are exposed.

9. The battery pack as claimed in claim 8, wherein the at least one first sensing hole includes a pair of first sensing holes facing each other with the first assembly rib therebetween and exposing the edge positions of the first end portions adjacent to each other.

10. The battery pack as claimed in claim 8, wherein:
 the first assembly rib protrudes from the holder body in a direction toward the plurality of battery cells, and
 the at least one hollow protrusion protrudes from the holder body in a direction away from the plurality of battery cells.

11. The battery pack as claimed in claim 8, wherein:
 the first assembly rib is between two adjacent first end portions, and
 the at least one hollow protrusion is formed among three adjacent first end portions of the plurality of battery cells.

12. The battery pack as claimed in claim 8, wherein the first assembly rib and the at least one hollow protrusion are arranged along the outer peripheral surface of one of the first end portions.

13. The battery pack as claimed in claim 12, wherein the first assembly rib and the at least one hollow protrusion are arranged at non-overlapping positions along the outer peripheral surface of the first end portion.

14. The battery pack as claimed in claim 12, wherein the first assembly rib and the at least one hollow protrusion are alternately arranged along the outer peripheral surface of the first end portion.

15. The battery pack as claimed in claim 12, wherein the at least one hollow protrusion includes a pair of hollow protrusions facing each other with the first assembly rib therebetween.

16. The battery pack as claimed in claim 12, wherein the at least one first sensing hole includes a pair of first sensing holes that are on opposite sides of the first assembly rib and through which portions of the edge positions of the first end portions adjacent to each other are exposed.

17. The battery pack as claimed in claim 16, wherein:
 the at least one hollow protrusion includes a pair of hollow protrusions, and
 a first direction, in which the pair of first sensing holes face each other with the first assembly rib therebetween, crosses a second direction, in which the pair of hollow protrusions face each other with the first assembly rib therebetween.

18. The battery pack as claimed in claim 17, wherein:
 the photocurable adhesive extends in the first direction and covers at least a portion of the first surface of the circuit board to which a pair of the measurement members respectively connected to the first end portions adjacent to each other are connected, and
 the photocurable adhesive extends in the second direction and covers a portion of at least the first end portions and the first assembly rib which are exposed between the pair of hollow protrusions.

19. The battery pack as claimed in claim 8, wherein the circuit board includes a second sensing hole through which portions of the edge positions of the first end portions adjacent to each other are exposed.

20. The battery pack as claimed in claim 19, wherein the portions of the edge positions of the first end portions adjacent to each other are exposed to the outside of the circuit board through a pair of first sensing holes in the cell holder and the second sensing hole in the circuit board.

21. The battery pack as claimed in claim 19, wherein the first assembly rib is a support between the outer peripheral surfaces of the first end portions adjacent to each other and is also exposed through the second sensing hole.

22. The battery pack as claimed in claim 21, wherein the photocurable adhesive is at the edge positions of the first end portions adjacent to each other which are exposed through the second sensing hole, and is on the first assembly rib which serves as a support between the outer peripheral surfaces of the first end portions adjacent to each other and is exposed through the second sensing hole.

23. The battery pack as claimed in claim 19, wherein the cell holder includes a pair of the hollow protrusions, each hollow protrusion surrounding the cooling passage connected to the gap between the outer peripheral surfaces of the first end portions adjacent to each other and are also exposed through the second sensing hole.

24. The battery pack as claimed in claim 23, wherein at least portions of the pair of hollow protrusions are covered with the photocurable adhesive.

25. A battery pack, comprising:
 a plurality of battery cells, each battery cell including a first end portion and a second end portion in a length direction thereof;
 a cell holder having a first surface through which portions of the first end portions of the plurality of battery cells are exposed in the length direction of the plurality of battery cells;
 a circuit board having a first surface through which portions of the first end portions of the plurality of battery cells and a portion of the first surface of the cell holder are exposed;
 measurement members connecting the plurality of battery cells to the circuit board; and
 a photocurable adhesive surrounding the measurement members,
 wherein:
 the first end portions of the plurality of battery cells, the first surface of the cell holder, and the first surface of the circuit board are arranged in a stepped manner at least partially exposed to an outside of the circuit board in the length direction of the plurality of battery cells and are at least partially covered by the photocurable adhesive,
 the cell holder includes:
  a holder body extending across the first end portions;
  a first assembly rib, the first assembly rib being a support between outer peripheral surfaces of the first end portions adjacent to each other; and
  at least one first sensing hole through which edge positions of the first end portions adjacent to each other are exposed, the circuit board includes a second sensing hole through which portions of the edge positions of the first end portions adjacent to each other are exposed, and the portions of the edge positions of the first end portions adjacent to each other are exposed to the outside of the circuit board through a pair of first sensing holes in the cell holder and the second sensing hole in the circuit board.

* * * * *